(12) United States Patent  (10) Patent No.: US 9,784,476 B2
Stein  (45) Date of Patent: Oct. 10, 2017

(54) PORTABLE SOLAR TRACKER

(71) Applicant: Howard Stein, White Plains, NY (US)

(72) Inventor: Howard Stein, White Plains, NY (US)

(73) Assignee: Howard Stein, White Plains, NY (US)

( * ) Notice: Subject to any disclaimer, the term of this patent is extended or adjusted under 35 U.S.C. 154(b) by 373 days.

(21) Appl. No.: 14/292,536

(22) Filed: May 30, 2014

(65) Prior Publication Data

US 2015/0007869 A1 Jan. 8, 2015

Related U.S. Application Data

(60) Provisional application No. 61/828,767, filed on May 30, 2013.

(51) Int. Cl.
F24J 2/38 (2014.01)
H02S 20/32 (2014.01)
F24J 2/54 (2006.01)

(52) U.S. Cl.
CPC .............. F24J 2/38 (2013.01); F24J 2/541 (2013.01); H02S 20/32 (2014.12); F24J 2002/5441 (2013.01); F24J 2002/5458 (2013.01); Y02E 10/47 (2013.01); Y02E 10/50 (2013.01)

(58) Field of Classification Search
CPC .......... F24J 2/38; F24J 2002/5441; E05F 3/02
USPC .......................................... 126/600; 136/246
See application file for complete search history.

(56) References Cited

U.S. PATENT DOCUMENTS

| | | | |
|---|---|---|---|
| 2,637,788 A * | 5/1953 | Bracken | G04F 1/00 185/37 |
| 3,093,858 A * | 6/1963 | Trask | E05F 3/108 16/54 |
| 3,179,396 A * | 4/1965 | Bracken | H01H 7/02 138/43 |
| 4,003,102 A * | 1/1977 | Hawks | E05F 1/025 16/72 |
| 4,185,615 A * | 1/1980 | Bottum | F24J 2/265 126/580 |
| 4,226,502 A * | 10/1980 | Gunzler | F24J 2/14 126/574 |
| 4,328,789 A | 5/1982 | Nelson | |
| 4,471,575 A * | 9/1984 | Stout | E05F 1/1066 16/80 |
| 4,937,913 A * | 7/1990 | Jentsch | E05F 3/102 16/51 |
| 4,999,872 A * | 3/1991 | Jentsch | E05F 3/102 16/58 |

(Continued)

FOREIGN PATENT DOCUMENTS

| | | | |
|---|---|---|---|
| CN | 201555377 U | * 8/2010 | |
| GB | 1106154 A | * 3/1968 | ............ F15B 11/076 |

Primary Examiner — Jorge Pereiro
(74) Attorney, Agent, or Firm — Leason Ellis LLP

(57) ABSTRACT

The tracking device of the present disclosure includes a platform, support structure, and a cylinder. The cylinder comprises a plunger, an interior space, an aperture, and a fluid within the cylinder. Forward actuation of the plunger within the interior space the fluid to be pushed through the aperture. The platform is operably connected to the plunger, so that movement of the plunger causes the platform to rotate about a pivot point of the support structure. The tracking device can have a solar panel connected to the platform. The tracking device can also be used in any application where tracking would be of use, such as for surveillance, or time-lapse photography.

7 Claims, 4 Drawing Sheets

(56) References Cited

U.S. PATENT DOCUMENTS

| | | | |
|---|---|---|---|
| 5,798,517 A | 8/1998 | Berger | |
| 6,065,184 A * | 5/2000 | Drury | E05F 1/025 16/81 |
| 7,464,703 B2 * | 12/2008 | Aaron | F24J 2/541 126/600 |
| 2004/0212210 A1 * | 10/2004 | Roach | B62D 33/0273 296/57.1 |
| 2009/0107486 A1 | 4/2009 | Tsai et al. | |
| 2010/0095955 A1 * | 4/2010 | Carrasco Martinez | F24J 2/5424 126/601 |
| 2010/0275904 A1 * | 11/2010 | Bathurst | F24J 2/38 126/600 |
| 2011/0048406 A1 * | 3/2011 | Hoffman | F24J 2/38 126/600 |
| 2011/0114080 A1 | 5/2011 | Childers et al. | |
| 2012/0285509 A1 * | 11/2012 | Surganov | F24J 2/38 136/246 |
| 2012/0318322 A1 | 12/2012 | Lanyon et al. | |
| 2013/0061845 A1 * | 3/2013 | Tan | F24J 2/38 126/582 |
| 2014/0124015 A1 * | 5/2014 | Full | H02S 20/32 136/246 |
| 2016/0052720 A1 * | 2/2016 | Pawelski | F15B 15/1476 198/836.3 |
| 2016/0156305 A1 * | 6/2016 | Full | H02S 20/32 136/246 |

\* cited by examiner

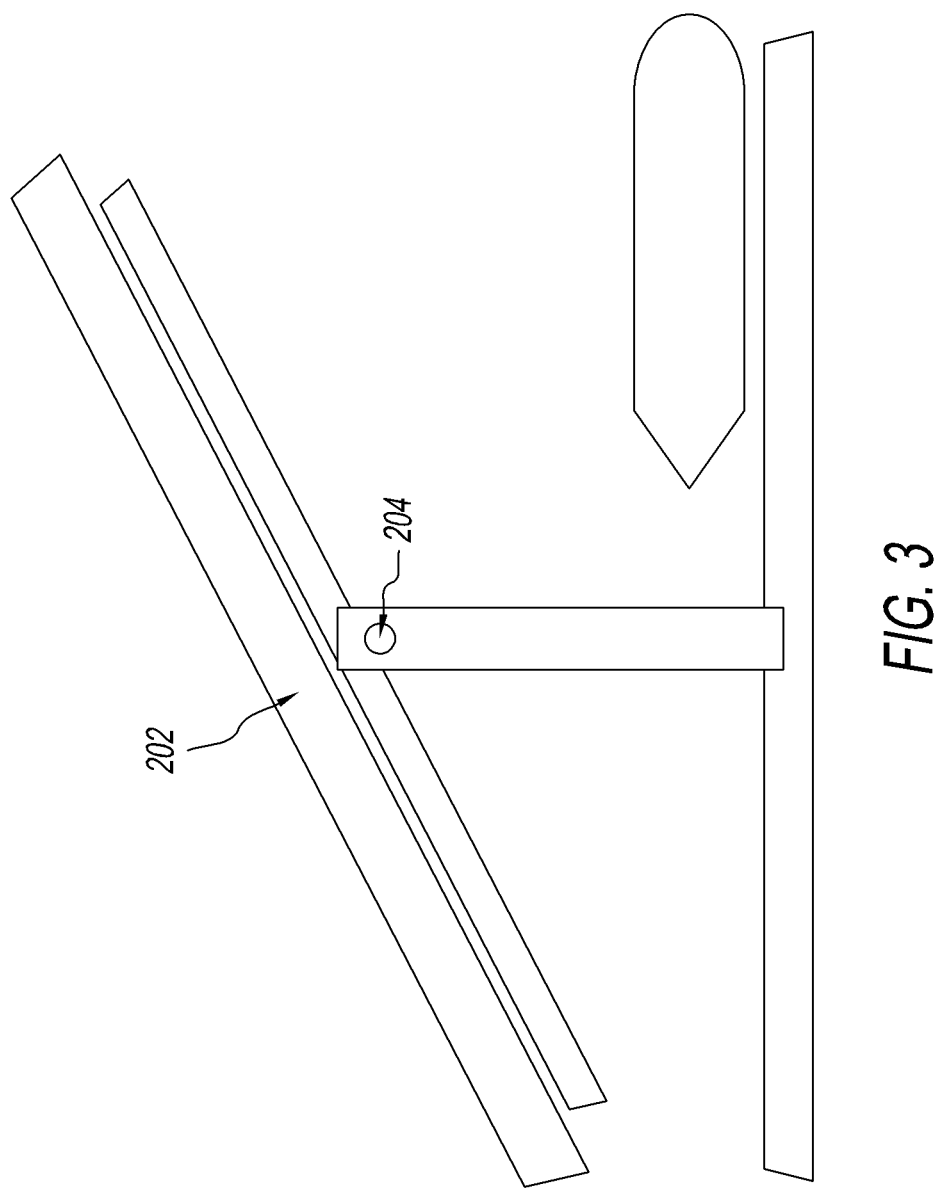

PORTABLE SOLAR TRACKER

CROSS-REFERENCE TO RELATED APPLICATIONS

The present application claims priority to U.S. Provisional Patent Application No. 61/828,767, filed on May 30, 2013, which is herein incorporated by reference.

BACKGROUND OF THE DISCLOSURE

1. Field of the Disclosure

The present disclosure relates generally to an apparatus for moving a solar panel to track with the sun for improved efficiency of solar power. More specifically, the present disclosure describes an apparatus that is attached to a structure that supports a platform or struts upon which sits a solar collector. The apparatus uses minimal to no mechanics, gearing, sensors, electricity or battery, to move the solar collector, which is approximately matched to the sun's arc through the daylight sky, allowing for improved efficiency, cost savings and extreme durability as compared to other solar trackers.

2. Description of the Related Art

Due to recent advances in technology, the need for alternative energy, and the growth of critical personal electronics such as iPads®, smart phones and other devices, small, portable solar panels have been designed specifically to power these devices. Mid-size or larger solar panels have also been developed to power appliances, light bulbs, rechargeable batteries, etc. Most of these solar panels are marketed for emergency use, adventure travelers and campers. They vary in solar energy harvest, how the energy is stored in a battery, physical size and portability. Some are the size of a large book and could be folded, may be a larger single panel, or also may be up to several or many feet across.

The challenge is that these panels take a long time to charge a device or a battery. Depending on the design of the battery, it could take up to eight hours of full sun, or days, if used in winter or intermittently cloudy conditions. The panels are typically placed flat on the ground or tilted facing south. When the sun is rising in the east until noon, the panel is getting light at an angle, and the same thing happens in the afternoon with the sun slowly progressing west. However, a solar panel is at maximum efficiency for its design only when the panel is directly facing the sun.

There are some devices currently available that provide for the panel to track with the sun. They provide either active or passive assistance to having the panels track with the sun. Active solar trackers are ones that provide mechanical assistance via software, timers and mechanics to track with the sun. Passive solar trackers are those move the panels via sensors and mechanics that might respond to heat or light. Both are expensive, complex solutions.

For applications under remote and/or harsh conditions, the current tracking technology is prohibitively expensive. They also require additional electricity from an additional panel or the existing panel or a battery to drive a motor, gears and perhaps software to direct the panel to rotate. Astronomers both amateur and professional have used stellar tracking devices as well as large solar arrays around the world. Scaling down these devices is not practical due to expense and the extra power needed to rotate a panel over 10-12 hours of daylight.

This present disclosure addresses these disadvantages of current devices.

SUMMARY OF THE DISCLOSURE

The present disclosure provides a tracking device that can be used with existing solar panels, or be integrated with a new solar collector. The device of the present disclosure includes a solar panel that lays on a platform or frame that can pivot on its center point. Attached to the frame is a cylinder, of which the interior is filled with fluid, plunger, a spring, and tube, which collectively serve as the driving mechanism to rotate the platform with the solar panel through the daylight. In the cylinder is a piston under spring pressure forcing a controlled rate of fluid through an aperture. As the fluid flows in at a certain rate, the piston moves. The piston is connected to a rod, which can then be connected to a pulley and wire or other devices that attach to the frame with the solar collector. The platform with the solar panel on it then rotates slowly around the center point as the spring pushes on the piston and forces the fluid out. Each morning the user pulls on the rod thereby pulling the piston back into its starting position, which will force the fluid back through the aperture. As described in greater detail below, the fluid can be liquid or air. The cylinder can have a single chamber through which the fluid moves. The cylinder can also have two chambers divided by a partition or wall, where the fluid moves between the two.

With minimal parts to wear out and a manual recharge, this simple, cost effective tracker will improve the efficiency of any small solar collector that can fit on the platform or be integrated with the frame by 20-50%. The device of the present disclosure is thus a significant improvement over any currently available solar trackers, because it can move a small solar panel with the sun while requiring no electricity, no sensors that respond to light, cold, or heat, and minimal gearing. It is inexpensive and can be used under the harshest of conditions.

Thus, in one embodiment, the present disclosure provides a tracking device. The tracking device comprises a platform, a support structure comprising a pivot point about which the platform rotates, a hollow cylinder having an interior space therein, an aperture in fluid communication with the interior space, and a plunger within the interior space. The plunger moves along a longitunidal axis of the cylinder within the interior space. The cylinder comprises a fluid therein, so that movement of the plunger causes the fluid to move through the aperture. The plunger is operably connected to the platform, so that movement of the plunger causes rotation of the platform about the pivot point.

In another embodiment, the present disclosure also provides a method of rotating a platform with a tracking device. The tracking device comprises a platform, and a support structure with a pivot point about which the platform rotates. A hollow cylinder has an interior space and a fluid within the interior space. The tracking device also includes an aperture in fluid communication with the interior space. A plunger within the interior space moves along a longitudinal axis of the cylinder within the interior space, wherein the plunger is operably connected to the platform. The method comprises the step of pushing the fluid from the interior space with the plunger, whereby movement of the plunger causes the platform to rotate about the pivot point.

In another embodiment, the present disclosure provides an engine for a tracking device. The engine comprises a hollow cylinder having an interior space and a fluid therein, an aperture in fluid communication with the interior space, a plunger within the interior space, and a capillary tube in fluid communication with the aperture. The plunger moves along a longitunidal axis of the cylinder within the interior space. Movement of the plunger causes the fluid to move through the aperture and the capillary tube.

BRIEF DESCRIPTION OF THE DRAWINGS

FIG. 3 is a side view of the tracking device of the present disclosure, with one embodiment of a support structure.

DETAILED DESCRIPTION OF THE DISCLOSURE

Figure 1:
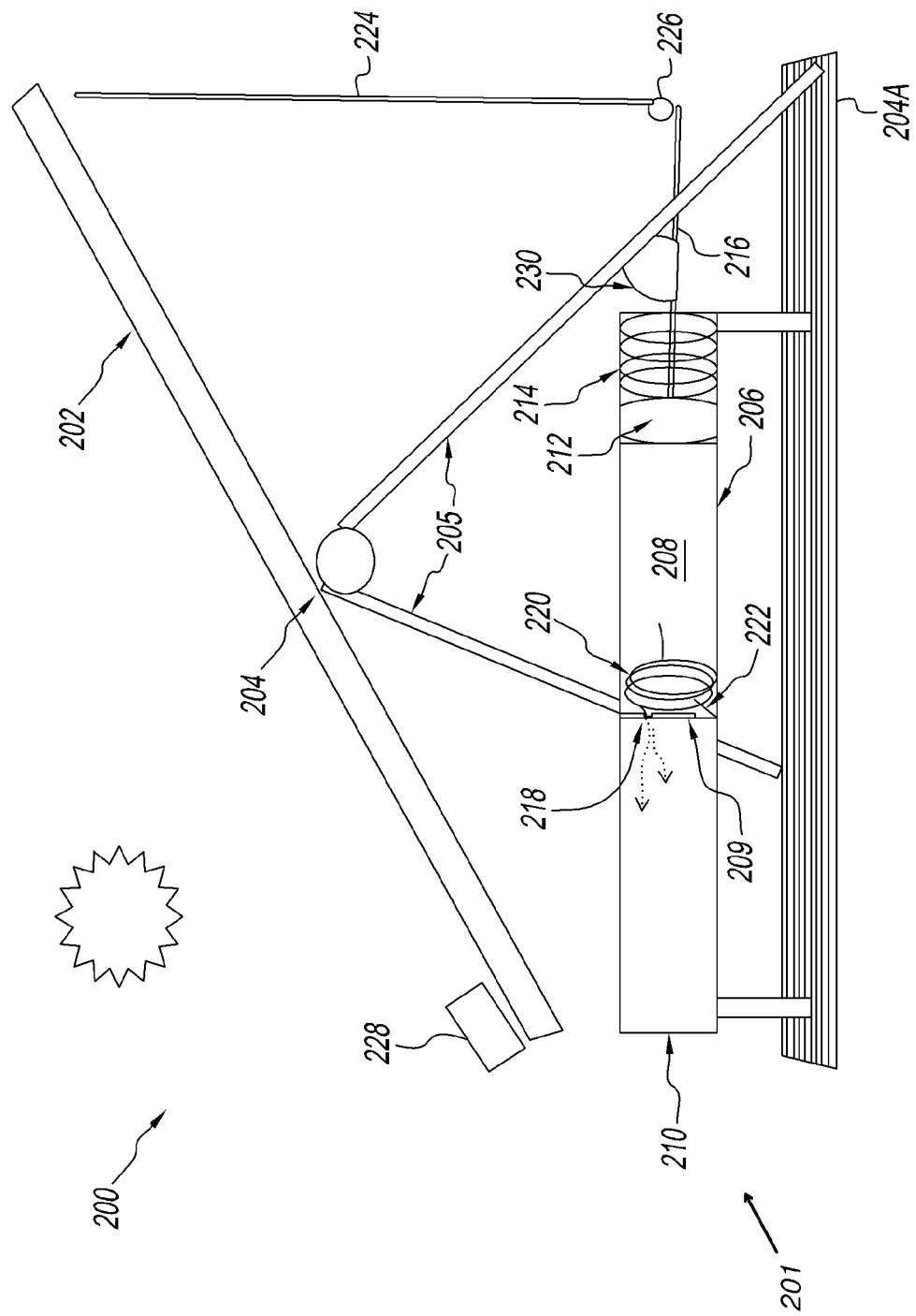
FIG. 1 is a side view of the tracking device of the present disclosure.
Figure 2:
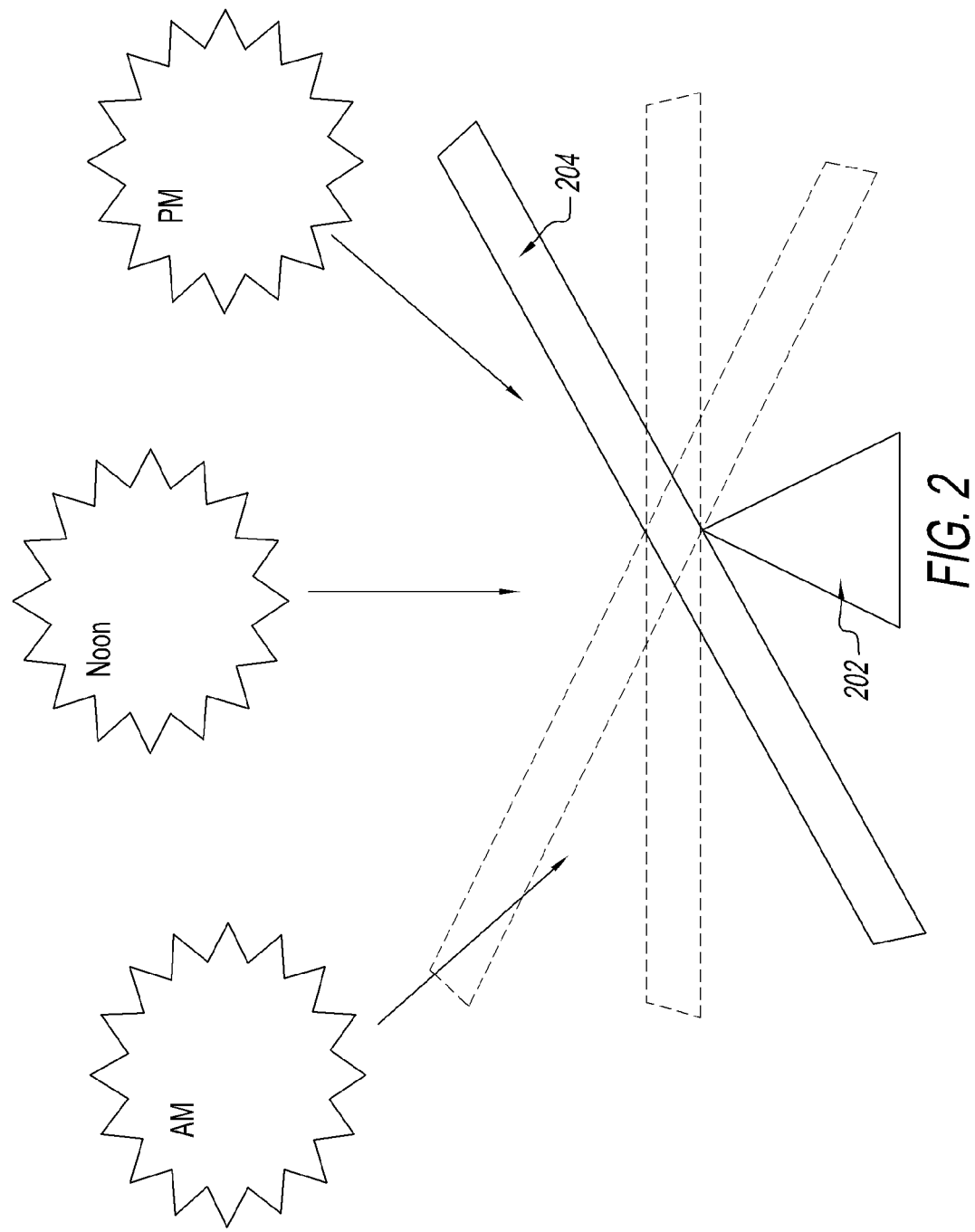
FIG. 2 is a schematic view showing how the tracking device can rotate a solar panel with the sun.

Referring to FIGS. 1-3, tracking device 200 is shown. Tracking device 200 has a platform 202 that can pivot around a support 204 and an engine 201. Engine 201 comprises cylinder 206 and plunger 212. In the manner described below, plunger 212 drives a fluid from one part of cylinder 206 to the other. Plunger 212 can be operably connected to platform 202 through connection to a cable 224. (As described in more detail below, "cable" 224 can also be a different connection mechanism.). Movement of plunger 212 pulls on cable 224, which in turn causes platform 202 to rotate about support 204. The dimensions of cylinder 206 and plunger 212, and the pressure applied by plunger 212, can be set so that a full cycle of rotation of platform 202 can correspond to an amount of daylight in a given day (e.g., 10 hours).

Thus, tracking device 200 of the present disclosure provides several advantages not found in currently available devices, such as currently available solar tracking devices. Device 200 of the present disclose does not require any electrical components such as motors or batteries, which require maintenance and could fail in the field. Device 200 uses a simple, low-cost engine 201 to drive platform 202, which is very easy for any type of user to manipulate and set up.

According to one embodiment of the present disclosure described herein, the present disclosure provides a method of moving a solar panel timed with the sun crossing the sky without using batteries, electricity, sensors, and minimal mechanics allowing for a manual reset, durable solar tracker.

The present disclosure comprises the following components, with all component numbers referring to FIG. 1:
200 Tracking Device
201 Engine
202 Platform
204 Pivot Point Bar
204A Support Structure Base
205 Support Structure
206 Cylinder
208 Chamber
209 Divider wall
210 Reservoir
212 Plunger
214 Spring
216 Rod
218 Micro Hole
220 Micro Tube
222 Check Valve
224 Cable
226 Pulley
228 Weight
230 Grip
301 Engine (alternative embodiment)
306 Cylinder
308 Chamber
309 Intake tube
309A Filter
312 Plunger
314 Spring
316 Rod
318 Capillary tube
319 Push-button valve Platform 202 can be a platform of any size to support a solar panel (not shown). The solar panel can be of various sizes. It can be connected or fastened to platform 202 via cordage, adhesive materials, clips or other means of attachment. Platform 202 can be a rigid platform of a set size. It could also be a frame, expanding frame which folds out or unravels, or struts that expand out to connect to the underside of the panel. It can be made of any material such as, but not limited to, metal, plastic, or fiberglass that is rigid enough to support the weight of different size solar panels. As shown in FIGS. 1-3, platform 202 can pivot on a central point around a bar 204, which is supported by the support structure 205 and a support structure base 204A. As shown specifically in FIG. 2, and as described in further detail below, support 202 can be made to pivot around support 204, to generally follow the position of the sun.

The supports and structure holding the solar panel could be in several configurations, as discussed below, and could also be made to fold out and up from a wide variety of configurations including but not limited to using pegs and other fasteners, scissors folding, crease folds, and hinges. It may take the form of an A-frame, H-frame or other type of support. FIG. 3, for example, shows an alternative H-frame type of support. The support structure 205 and the support structure base 204A could be made of any material such as, but not limited to, metal, plastic, and fiberglass.

Device 200 and platform 202 can be permanently integrated with a specific solar panel, or as described above, the panel can be removably connected to platform 202. Platform 202 can be scaled to fit different size panels. Tracking device 200 can have various mechanisms to expand and contract to fit different size solar panels and from different manufacturers. The solar panels can be secured by fasteners such as screws, brackets, mounts, or Velcro®. Some panels may pressure fit, and some may bolt or screw. In one embodiment, platform 202 has a special non-slip surface, so the panel can just be placed and not fall off.

Cylinder 206 can be connected or fastened to the support structure 205, under or to the side of the support structure 204A. Cylinder 206 may also be connected or fastened to base 204A. Cylinder 206 serves as the drive mechanism for device 200. The specifications for the components described below can be determined by the variables or parameters of the particular application—for example size of the solar panel, amount of daylight, latitude where device 200 is used, etc. In one embodiment, the size of cylinder 206 is approximately ½ inch by 3 inches but could be much larger or smaller. Cylinder 206 could have a diameter from one-eighth of an inch up to ten inches, or any subranges therebetween. The length of cylinder 206 could be from one-half inch to twenty-four inches, or any subranges therebetween.

In the embodiment shown in FIG. 1, cylinder 206 of engine 201 is divided into two hollow parts, a first chamber 208 and a second chamber or reservoir 210. As described in further detail below, the cylinder of engine 201 and the present disclosure could have a single chamber therein. Reservoir 210 could be part of cylinder 206, or could be a loose liquid proof material such as a plastic type bag or bladder attached to the chamber 208. Cylinder 206 could be made of metal, plastic or other sturdy material. Larger-scale cylinders 206 could allow for movement of large solar panels. In addition, while cylinder 206 is shown as having a cylindrical shape, the present disclosure also contemplates other cross-sectional shapes, such as rectangular or square, which may serve the same purpose.

On one side and inside of the cylinder is a plunger or piston 212. A rod 216 is attached to the plunger. An expansion spring 214 applies force between one side of wall of chamber 208 and plunger 212. Spring 214 applies tension or force to plunger 212, which forces plunger 212 towards the other end of chamber 208. Resistance to the plunger can be provided by a fluid within chamber 208. The fluid can be, but is not limited to, glycerin, water, hydraulic fluid, oils, air, and any combinations thereof. Other liquids may be suitable. Plunger 212 may take a variety of forms, shape and materials, and be forced to move within chamber 208 by methods other than springs, or different varieties of spring-like materials that will exert the necessary force.

Chamber 208 and reservoir 210 are separated by divider wall 209. Wall 209 has a small micro hole 218 therein that will allow the fluid in chamber 208 to flow into reservoir 210 at a slow rate of up to twelve hours or more. The rate of flow of the fluid from chamber 208 into 210 can be set by adjusting a number of characteristic of cylinder 206, such as its size, the size of plunger 212, the tension in spring 214, or the type and viscosity of the fluid used. Micro-hole 218 may be larger or smaller than described, or in a different shape than round.

In one embodiment, chamber 208 will contain a micro tube 220 that can be filled with the fluid and attached to the end of chamber 208 and to the micro hole 218. This provides an additional way for the fluid to flow out of chamber 208 under pressure from plunger 212, and into reservoir 210. Micro-tube 220 can be made of a flexible nylon, or other suitable material. Tube 220 may be another material other than nylon, or a tube may not be used at all. Tube 220 may be any length, or take another shape than a tube. It may be round flexible material, or any material and shape that will serve the same function.

On the same side of chamber 208 as the micro hole 218 is a check valve 222 between chamber 208 and reservoir 210. Check valve 222 can also be within wall 209. Check valve 222 will serve as a one-way valve that allows fluid to flow back into the chamber when the user pulls back on the rod 216.

When the user manually pulls back on rod 216, the fluid will be drawn back into the chamber 208 from reservoir 210, which will allow another cycle—i.e., the fluid will slowly begin flowing back into reservoir 210. Rod 216 could be a metal, plastic, or similar material, flexible wire, cable, helical screw, or geared mechanism. Rod 216 is attached at one end to plunger 212, comes through the wall of cylinder 206 and attaches to a cable 224, which has been through a pulley or eye 226. Rod 216 could also be directly connected to cable 224. Cable 224 is attached to platform 202. As plunger 212 moves through chamber 208 under pressure from spring 214, the fluid flows into the reservoir 210, as described above. Rod 216, attached to the plunger 212, pulls cable 224, which in turn pulls on one end of platform 202 upon which the solar panel sits. Over daylight, e.g. ten to twelve hours, one end of the platform 202 (and thus the panel) drops according to the flow of fluid. At the end of the cycle, the user can manually pull the rod 216, which may have a grip 230 or similar device, at the beginning of the day. Markings may indicate how many hours plunger 212 has left, allowing the user to set the timing of cylinder 206 at the user's discretion, even at midday. Cylinder 206 may be transparent to display how far plunger 212 has progressed. The markings may also be on rod 216, or other suitable locations.

The present disclosure uses the term "cable" with respect to cable 224 for ease of description. However, cable 224 can be different methods of connecting platform 202 to engine 201 to achieve the desired rotation of platform 202 described above. For example, instead of a cable, a helical screw mechanism or gear system could be used. Such a device could connect directly to rod 216 and/or platform 202, without the use of pulley 226.

The present disclosure also contemplates a way or method of motorizing the reset of the cylinder as to allow multiple days without manual maintenance. Tracking device 200 may also have a lever, switch, or other assistive device (not shown) that would allow manual mechanical advantage to pull the spring back to reset to the start position. The lever, switch, or assistive device may provide assistance when cylinder 206 has larger dimensions. Tracking device 200 may also have a trip device (not shown), without battery operation, that would allow a reset to the start, neutral or desired position. Tracking device 200 may also have a motor (not shown), battery powered or otherwise, to automatically pull the spring back to reset to the start or other desired position. This motor could be powered by the panel or an additional small panel mounted elsewhere to provide enough power.

Figure 1A:
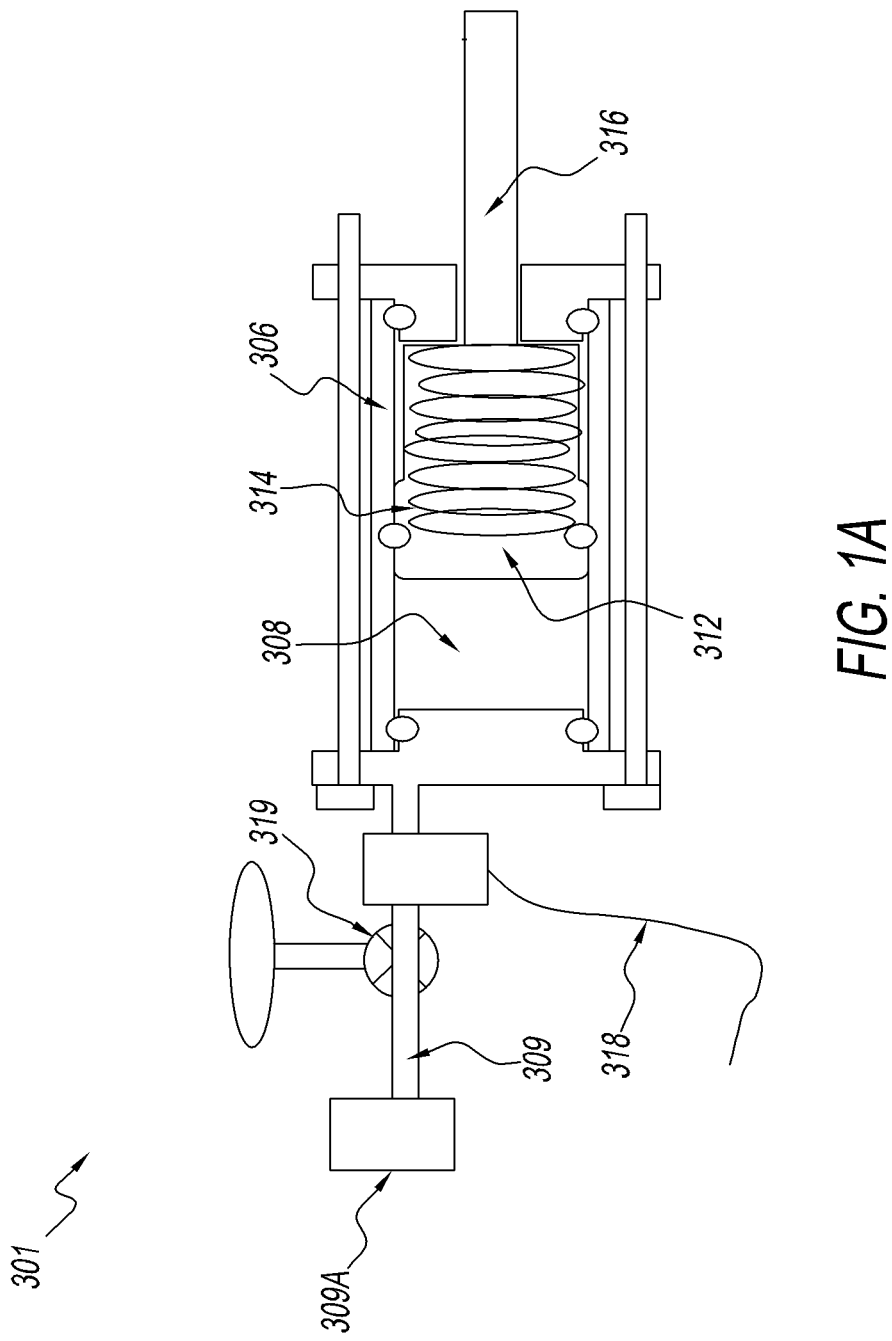
FIG. 1A shows a first alternative embodiment of the engine of the tracking device of FIG. 1.

Referring to FIG. 1A, a second embodiment of the engine of the present disclosure is shown, referred to by numeral 301. Engine 301 can have cylinder 306 functions in a similar manner to cylinder 206, with the notable exception that there is one main chamber 308 therein. Cylinder 306 has plunger 312, and a spring 314 that acts on plunger 312. Rod 316 is connected to plunger 312 and cable 224.

Cylinder 306 can be particularly useful or preferred when air is used as the fluid within chamber 308. In applications where there are wide ambient temperature fluctuations (e.g., cooler in the morning, hot during midday), the density and/or viscosity of a liquid fluid may vary greatly. This causes problems with repeatable performance over the time cycle of device 200. As air is less subject to this variation, it may be preferred as the fluid.

Similarly to what is described above with respect to cylinder 206, to begin the timed cycle, a user pulls rod 316 back, which causes plunger 312 to draw back as well, and force spring 314 into a compressed state. The dimensions of cylinder 306 are selected so that spring 314 pushes on plunger 312 as spring 314 decompresses. The air in chamber 308 passes out through an end opposite to where plunger 312 is located. The air in chamber escapes through the ambient environment through capillary tube 318. As plunger 312 traverses the longitudinal axis of chamber 308, it pulls on cable 224, which in turn rotates platform 202.

When air is used as the fluid in the cylinders of the present disclosure, it can be difficult to design a wall with micro-holes, as in cylinder 206. Due to its low viscosity and density, air will travel through an orifice more quickly that liquid. Thus, when using micro-hole 218 with air, it can be very difficult to find an appropriate size for micro-hole 218, which is also easily manufactured. This is one reason why capillary tube 318, in conjunction with a single chamber 308, works particularly well with air as the fluid. Using air is also advantageous in that cylinder 306 has fewer mechanical components, making it easier to manufacture and less subject to wear and failure.

To restart the cycle once plunger 312 has reached the end of its stoke or partially thereof, the user pulls back on rod 316. This draws air back into chamber 308 through intake tube 309, the latter of which draws air from the ambient environment. The present disclosure has discovered that when drawing air into chamber 308 in this manner, particulate contaminants may be drawn into chamber 308. These contaminants may clog capillary tube 318, so intake tube 309 can have a filter 309A in communication therewith. Filter 309A can remove some or all of any contaminants from the air drawn into chamber 308. Cylinder 306 can also have a push-button valve 319, which can be in fluid communication with intake tube 309, to stop the flow of air therethrough if desired.

In the shown embodiment, capillary tube 318, intake tube 309, and filter 309A are all external to cylinder 306. The present disclosure contemplates that these components could be within or in direct communication with cylinder 306. For example, Capillary tube 318 could be in direct fluid communication with chamber 308, for example by having an end within the wall of cylinder 306. Filter 309A could be disposed in or about chamber 308, to provide the functionality described above.

Engine 301 can have the same characteristics as engine 201 described elsewhere in the present disclosure. For example, engine 301 can be made of the same materials as engine 201, and cylinder 306 can have the same dimensional characteristics of cylinder 206.

For the platform 202 to tilt with the sun, tension can be provided by a weight 228, which can be located on one side of platform 202, and to place a biasing force thereon that opposes the force provided by cable 224. There can also be a spring (not shown) around the pivot point bar 204. In other embodiments, tension may be provided by springs, a tensioning system, friction, or gearing on other parts of the support structure and support base.

In one embodiment, platform 202 will not only pivot on a single axis but also allow for the location of the latitude of the user, by providing two axes of movement. This will give the panel further increased efficiency. Axes of tilting can be adjusted manually by the user. Adjustment can also happen by the design and tilt position of the platform as it goes across the pivot point.

To stabilize device 200, there can be a method of fastening support structure base 204A to the ground, vehicle or location. This stabilization can be provided by spikes, adhesives, hook and loop fasteners (e.g., Velcro®), suction cups, bolts, hooks, screws, weights, bags that can be filled with sand or dirt, cables that will secure to objects, ground spikes, cement, or other methods. There can also be holes so that tracker device 200 may be secured into building materials on a house/boat/RV and the like. There may be spikes that fold out to allow pushing and securing into the ground, or stabilization bars that fold out to a wider foot print. There may be parts that are hollow that can be filled with heavy material such as cement for additional stabilization.

In one embodiment, to use the tracking device 200, a user will start by unfolding platform 202, face platform 202 toward the sun in the start position, stabilize it to the ground if necessary, put the solar panel with battery or device to be charged nearby, attach if necessary and then manually pull the cylinder handle 216 or grip 230 back under tension to start the mechanism for the desired hours. The tracking device of the present disclosure can also include all of the above-described components as permanently attached to one another in a ready-to-use setup.

In another embodiment there may be a detachable mounting mechanism or method of allowing the tracking device 200 to be mounted on a pole, roof or other structure.

The present disclosure also contemplates that cylinder 206 may be a detachable, replaceable component, or contain multiple components that are replaceable or interchangeable. Reservoir 210 may be separated from chamber 208 by a variety of methods, such as screw thread or temporary seal.

Tracking device 200 and platform 202 can be driven by engine 201 or 301 in various configurations of gearing and cabling, in addition to what is described above with respect to cable 224. The cabling could be fixed vertical or horizontal, and mounted in a variety of places depending on the usage and size of the solar panel. Platform 202 could be center posted, or H configuration to support the solar panel. Tracking device 200 can fold flat for transportation and storage. The mechanisms and how it is folded will vary with the design. There may be an embodiment that does not fold at all.

As alluded to above, tracking device 200 can have height adjustments, to allow the user to position platform 202 to maximize the efficiency and harvesting of solar energy. Tracking device can also have a folding gnomon (not shown) or other pointing device, which will indicate sun position by shadow similar to a sundial. Tracking device 200 may also have a compass or other directional indicators. Tracking device 200 may also have an optimal panel angle or latitude indicator.

The present disclosure is described in the context of moving or rotating a solar panel, but tracking device 200 is suitable for use in any application wherein moving a platform over a period of time would be desired. Tracking device 200 can drive platform 202 very slowly over a number of hours at low cost, and this could be advantageous in many ways. For example, tracking device 200 could be used in time-lapse photography. If platform 202 rotated horizontally with a camera on it, that would enable time lapse photography while panning, not just in one position. That functionality is currently available at a very high cost using sophisticated electronics. Another application could be in surveillance, where a camera could pan slowly to cover a wider area over a longer period of time. This would be helpful where there is little electricity available. Tracking device 200 could also be used in astronomy application, for example to approximately monitor and/or photograph location and movement of stars as the move across the sky at night.

While the present disclosure has been described with reference to one or more particular embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this disclosure.

What is claimed is:

1. A tracking device, comprising:
   a platform;
   a support structure comprising a pivot point about which said platform rotates;
   a hollow cylinder having an interior space therein and a fluid in said interior space wherein said fluid is air;
   an aperture in said cylinder, so that said aperture is in fluid communication with said interior space;
   a capillary tube connected to said aperture, so that said capillary tube is also in fluid communication with said interior space; and
   a plunger within said interior space, so that said plunger moves along a longitudinal axis of said cylinder within said interior space,
   wherein movement of said plunger causes said fluid to move through said aperture and said capillary tube, and
   wherein said plunger is operably connected to said platform, so that movement of said plunger causes rotation of said platform about said pivot point, wherein a cable is connected to said plunger and said platform, so that movement of said plunger pulls on said cable, causing rotation of said platform.

2. The tracking device of claim 1, further comprising a weight on said platform.

3. The tracking device of claim 1, further comprising a solar panel connected to said platform.

4. A tracking device, comprising
   a platform;
   a support structure comprising a pivot point about which said platform rotates;
   a hollow cylinder having an interior space;
   an aperture in fluid communication with said interior space;
   a plunger within said interior space, so that said plunger moves along a longitudinal axis of said cylinder within said interior space,
   wherein movement of said plunger causes said fluid to move through said aperture and said capillary tube, and
   wherein said plunger is operably connected to said platform, so that movement of said plunger causes rotation of said platform about said pivot point, wherein said interior space is divided into a first chamber and a second chamber, wherein said first chamber and said second chamber are separated by a divider wall, and said aperture is in said divider wall.

5. The tracking device of claim 4, further comprising a spring within said first chamber, wherein said spring is in contact with and applies tension to said plunger.

6. The tracking device of claim 4, wherein said cylinder further comprises a tube in fluid communication with said aperture in said divider wall, said first chamber, and said second chamber, to facilitate the flow of said fluid between said first chamber and said second chamber.

7. The tracking device of claim 4, further comprising a check valve in said divider wall, wherein said check valve restricts flow of said fluid from said first chamber to said second chamber.

* * * * *